US007871347B2

(12) United States Patent
Kamada

(10) Patent No.: US 7,871,347 B2
(45) Date of Patent: Jan. 18, 2011

(54) BICYCLE REAR SPROCKET ASSEMBLY

(75) Inventor: Kenji Kamada, Osaka (JP)

(73) Assignee: Shimano Inc., Osaka (JP)

(*) Notice: Subject to any disclaimer, the term of this patent is extended or adjusted under 35 U.S.C. 154(b) by 44 days.

(21) Appl. No.: 11/870,532

(22) Filed: Oct. 11, 2007

(65) Prior Publication Data

US 2009/0098966 A1 Apr. 16, 2009

(51) Int. Cl.
*F16H 55/12* (2006.01)
*F16H 55/30* (2006.01)

(52) U.S. Cl. ........................ 474/160; 474/152; 474/164

(58) Field of Classification Search ................. 474/160, 474/164, 152

See application file for complete search history.

(56) References Cited

U.S. PATENT DOCUMENTS 2,451,690 A 10/1948 Oehler
4,594,910 A 6/1986 Nagano
5,194,051 A * 3/1993 Nagano ...................... 474/160
5,213,550 A * 5/1993 Wu ............................ 474/160
5,503,600 A * 4/1996 Berecz ....................... 474/160
5,766,106 A 6/1998 Edwards
5,935,034 A * 8/1999 Campagnolo ............... 474/160
6,102,821 A * 8/2000 Nakamura .................. 474/160
6,176,798 B1 * 1/2001 Nakamura .................. 474/160
6,264,575 B1 * 7/2001 Lim et al. ..................... 474/77
6,340,338 B1 1/2002 Kamada
6,382,381 B1 * 5/2002 Okajima et al. ............... 192/64
6,428,437 B1 * 8/2002 Schlanger ................... 474/160
6,488,603 B2 * 12/2002 Lim et al. ................... 474/160
6,866,604 B2 * 3/2005 Kamada et al. ............. 474/160
7,344,463 B2 * 3/2008 Reiter ......................... 474/160
7,585,240 B2 * 9/2009 Kamada ...................... 474/160
2004/0070166 A1 * 4/2004 Valle .......................... 280/260
2004/0121867 A1 * 6/2004 Reiter ........................ 474/160
2006/0172840 A1 * 8/2006 Kamada ..................... 474/152

FOREIGN PATENT DOCUMENTS

DE 103 42 638 A1 4/2005
DE 20 2004 019 270 U1 6/2005
EP 0 510 371 A1 10/1992

(Continued)

OTHER PUBLICATIONS

Extended European Search Report of corresponding EP Application No. 08 16 3849.6 dated Oct. 14, 2010.

*Primary Examiner*—Michael R Mansen
*Assistant Examiner*—Henry Liu
(74) *Attorney, Agent, or Firm*—Global IP Counselors, LLP

(57) ABSTRACT

A bicycle rear sprocket assembly has a sprocket carrier, a first sprocket, a second sprocket and a third sprocket. The first and second sprockets are attached to opposite axial sides of the outer end portion of the attachment member of the sprocket carrier using a common fastener that extends through the first and second attachment portions and the outer end portion of the attachment member. The third sprocket is disposed on adjacent the second sprocket. The second sprocket has a free edge spaced radially inwardly from the common fastener by a distance at least as large as one-half of a maximum transverse dimension of the fastener measured in a direction perpendicular to the rotation axis. At least one space maintaining projection extends axially toward an adjacent one of the second and third sprockets.

19 Claims, 16 Drawing Sheets

FOREIGN PATENT DOCUMENTS

| | | | |
|---|---|---|---|
| EP | 0 765 802 | A2 | 4/1997 |
| EP | 1 074 462 | B1 | 2/2001 |
| EP | 1 431 172 | A2 | 6/2004 |
| EP | 1 439 118 | A2 | 7/2004 |
| JP | 59-165293 | U | 11/1984 |

* cited by examiner

S1
30a
30b
30c
30f
34c
34b
35e
34a
35f
C1
35c
34b
35d
32a
35b
32c
36
S2
32b
32f
36
36
36
36

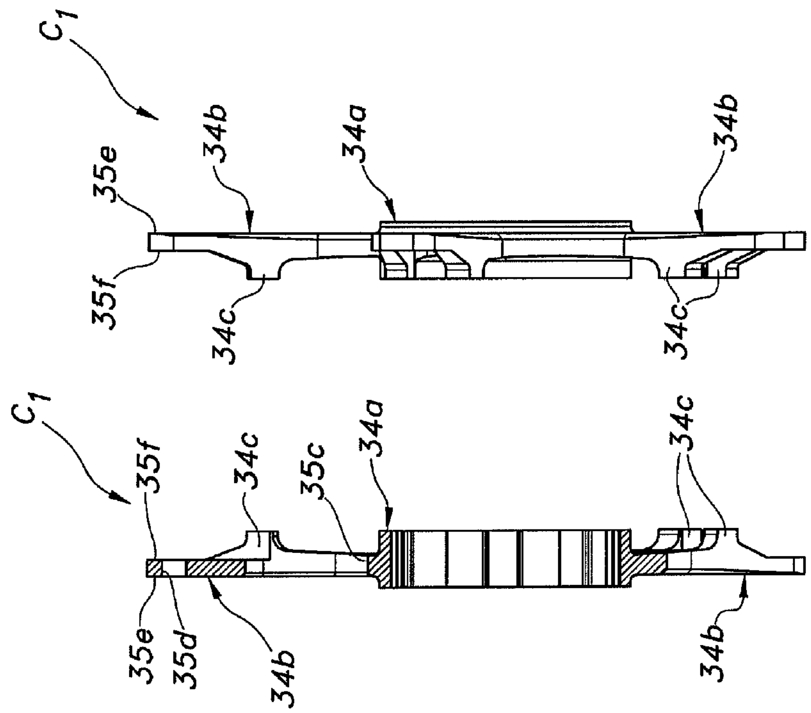
FIG. 15
FIG. 14
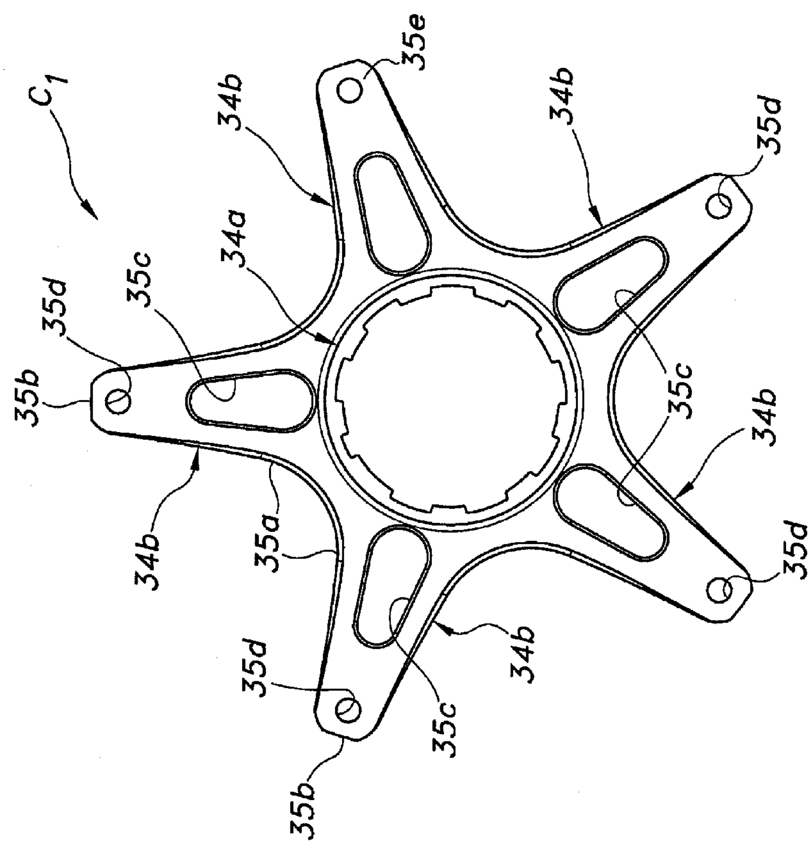
FIG. 13

S2
32a
32d
32e
32g
32f
32c
32b
F
E
D

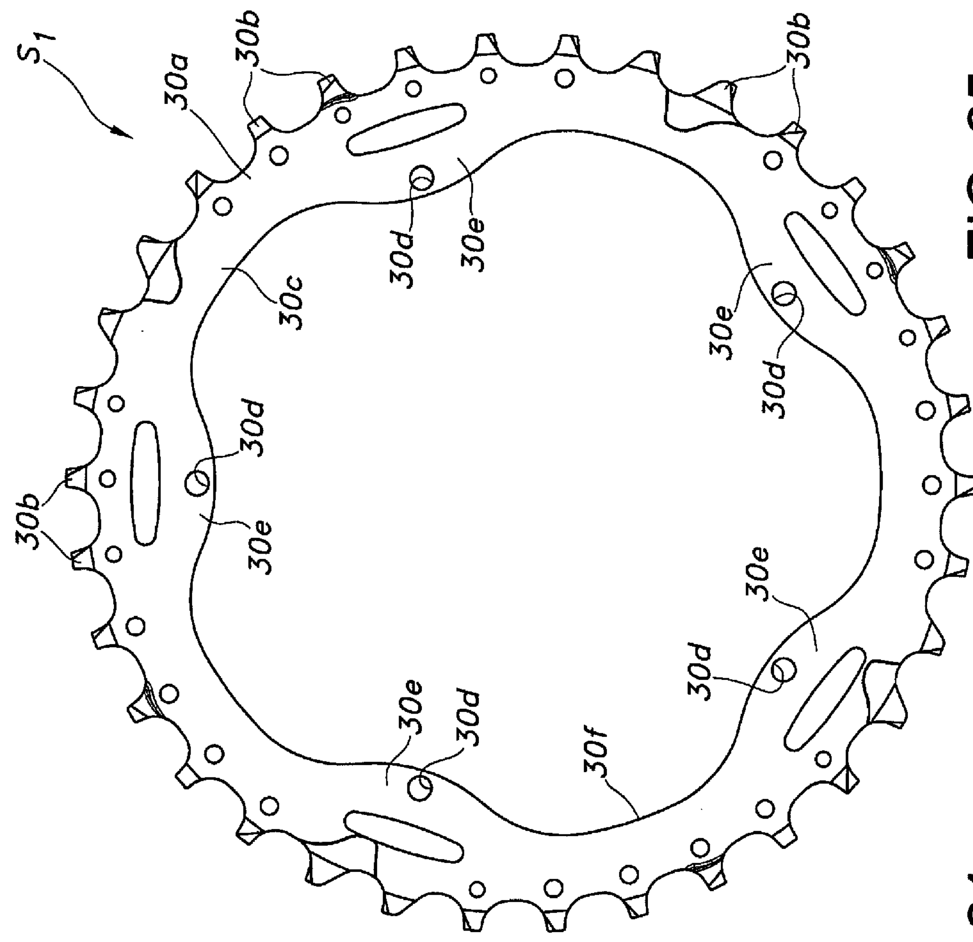
FIG. 25
FIG. 24
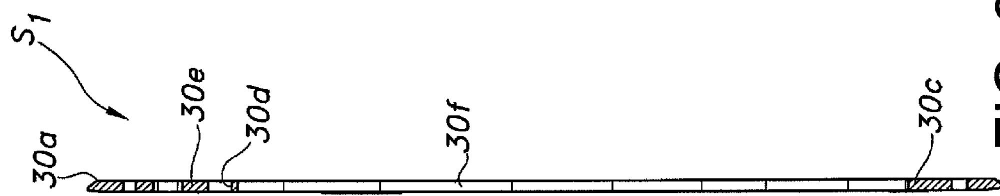
FIG. 23

BICYCLE REAR SPROCKET ASSEMBLY

BACKGROUND OF THE INVENTION

1. Field of the Invention

This invention generally relates to multiple sprocket assemblies for bicycles. More specifically, the present invention relates to a bicycle rear sprocket assembly that is configured to minimize bending of and maintain proper spacing between the sprockets.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle to meet the demands of the riders.

In recent years, as the number of speeds available in bicycle transmissions has increased, the number of sprockets installed on the rear-wheel sprocket assembly of such bicycles has increased seven sprocket wheels or more. As a result, the weight of the bicycle has increased. Thus, there is a desire to reduce the weight of the bicycle. In other words, in pursuit of faster running speed, it is desirable to reduce the weight of all kinds of parts of the bicycle.

In order to reduce the weight of a multiple sprocket assembly, a spider (sprocket support), which supports a plurality of ring-shaped sprocket wheels, has been used. By using a spider, a light metal such as aluminum, etc., is generally used for the spider, while various types of steel materials are used for the sprockets to provide adequate strength. One example of a multiple sprocket assembly that uses a spider is disclosed in U.S. Pat. No. 6,102,821 (assigned to Shimano Inc.). In this patent, two spiders are used with each spider supporting two sprockets. Each spider has a boss part and a plurality of support arms which extend radially outward from the outer circumferential surface of the boss part in directions perpendicular to the axis of the boss part. The sprockets are attached to mounting surfaces on opposite side surfaces of each of the support arms. Accordingly, this construction is greatly improved in terms of weight reduction.

However, one drawback of a multiple sprocket assembly constructed in this manner is that if the spider is made too thin, then the sprocket may deflect towards the adjacent sprocket. This situation can result in degrading the shifting performance of the rear derailleur. On the other hand, if the spider is made thicker, weight of the multiple sprocket assembly increases.

In view of the above, it will be apparent to those skilled in the art from this disclosure that there exists a need for an improved bicycle rear sprocket assembly. This invention addresses this need in the art as well as other needs, which will become apparent to those skilled in the art from this disclosure.

SUMMARY OF THE INVENTION

One object of the present invention is to provide a bicycle rear sprocket assembly which is relatively lightweight, strong and resists deflection of the sprockets during shifting of the chain from one sprocket to the adjacent sprocket.

Another object of the present invention is to provide a bicycle sprocket assembly which is relatively easy and inexpensive to manufacture and assemble.

The foregoing objects can basically be attained by providing a bicycle rear sprocket assembly, which includes a sprocket carrier, a first sprocket, a second sprocket and a third sprocket. The sprocket carrier includes at least one attachment member with an inner end portion and an outer end portion disposed radially outwardly of the inner end portion relative to a rotation axis of the sprocket carrier. The first sprocket includes a first attachment portion and a first chain engaging portion with a plurality of first teeth. The first sprocket is disposed on a first axial side of the attachment member. The second sprocket includes a second attachment portion and a second chain engaging portion with a plurality of second teeth that are fewer in total number than a total number of the first teeth of the first sprocket. The second sprocket is disposed on a second axial side of the attachment member. The third sprocket includes a third chain engaging portion with a plurality of third teeth that are fewer in total number than a total number of the second teeth of the second sprocket. The third sprocket is disposed on a second axial side of the second sprocket. The first and second attachment portions are attached to the outer end portion of the attachment member using a common fastener that extends through the first and second attachment portions and the outer end portion of the attachment member. The second attachment portion has a free edge spaced radially inwardly from the common fastener by a distance at least as large as one-half of a maximum transverse dimension of the fastener measured in a direction perpendicular to the rotation axis. At least one of the attachment member, the second sprocket and the third sprocket has at least one space maintaining projection extending axially towards an adjacent one of the second and third sprockets.

These objects and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 13 is an inner axial elevational (laterally inner) view of the sprocket carrier illustrated in FIGS. 11 and 12;

FIG. 14 is a cross-sectional view of the sprocket carrier illustrated in FIGS. 11-13, as seen along section line 14-14 of FIG. 12;

FIG. 15 is a right side (front) elevational view of the sprocket carrier illustrated in FIG. 12;

FIG. 23 is a cross-sectional view of the second sprocket illustrated in FIGS. 21-22, as seen along section line 23-23 of FIG. 22;

FIG. 24 is a right side (front) elevational view of the second sprocket illustrated in FIG. 22;

FIG. 25 is an inner axial elevational (laterally inner) view of the sprocket carrier illustrated in FIGS. 21-24;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
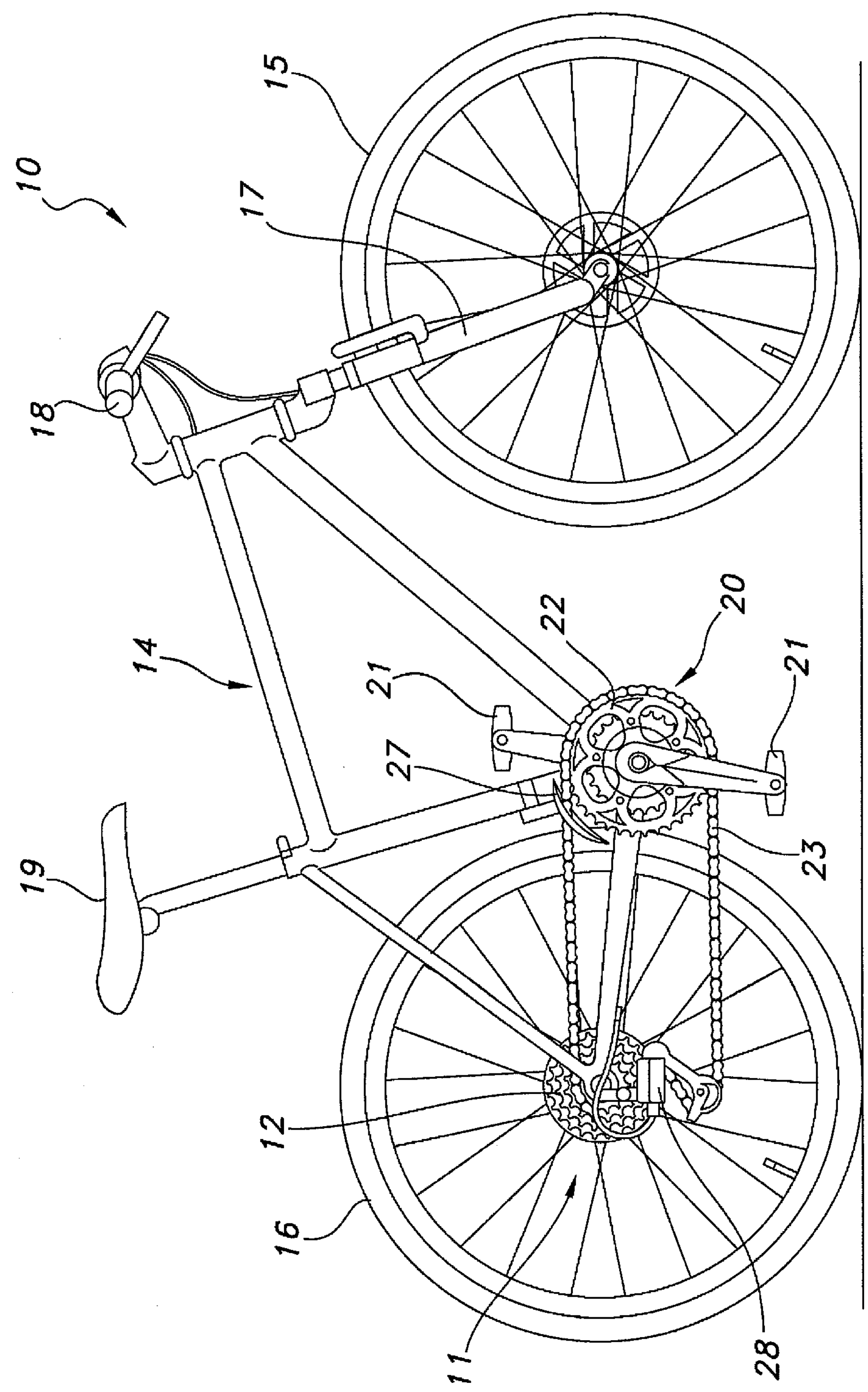
FIG. 1 is a side elevational view of a bicycle having a rear wheel with a bicycle rear sprocket assembly in accordance with a first embodiment of the present invention.
Figure 2:
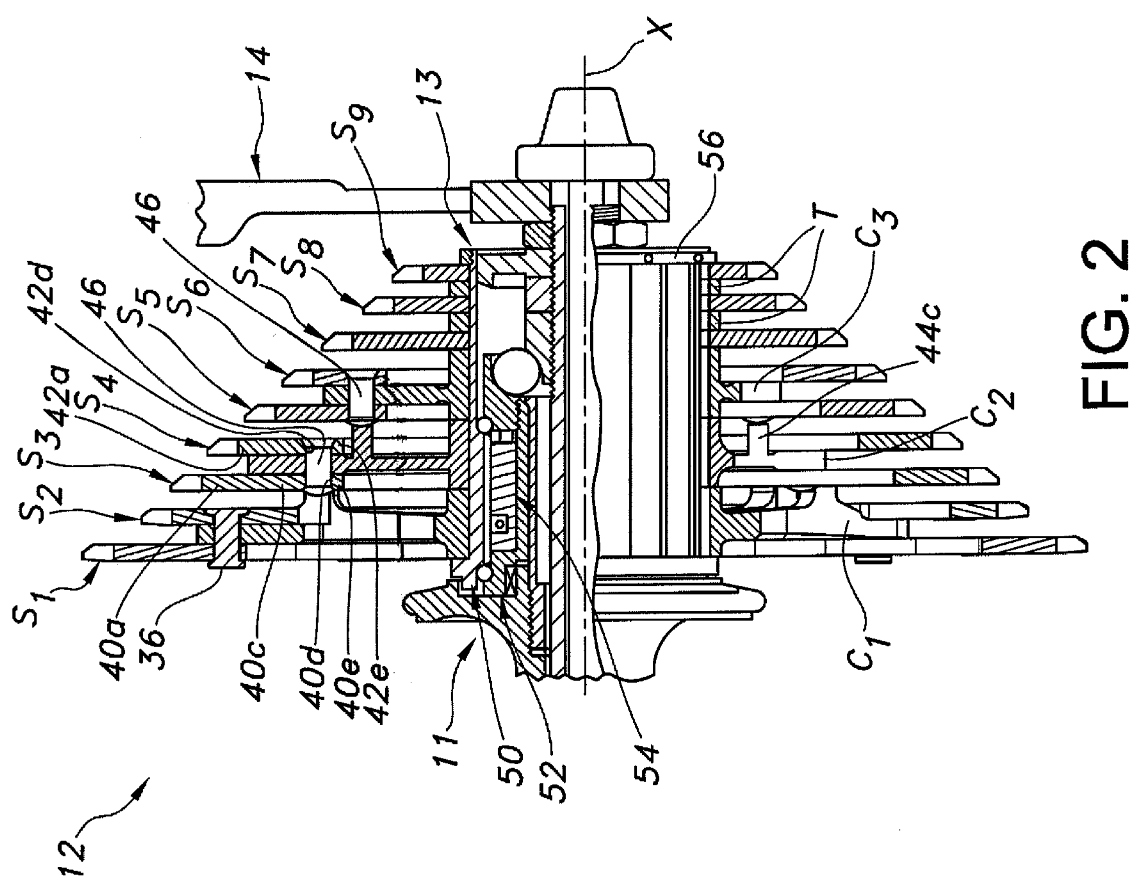
FIG. 2 is a partial cross-sectional view of the rear hub with the multiple rear sprocket assembly in accordance with the present invention.
Figure 3:
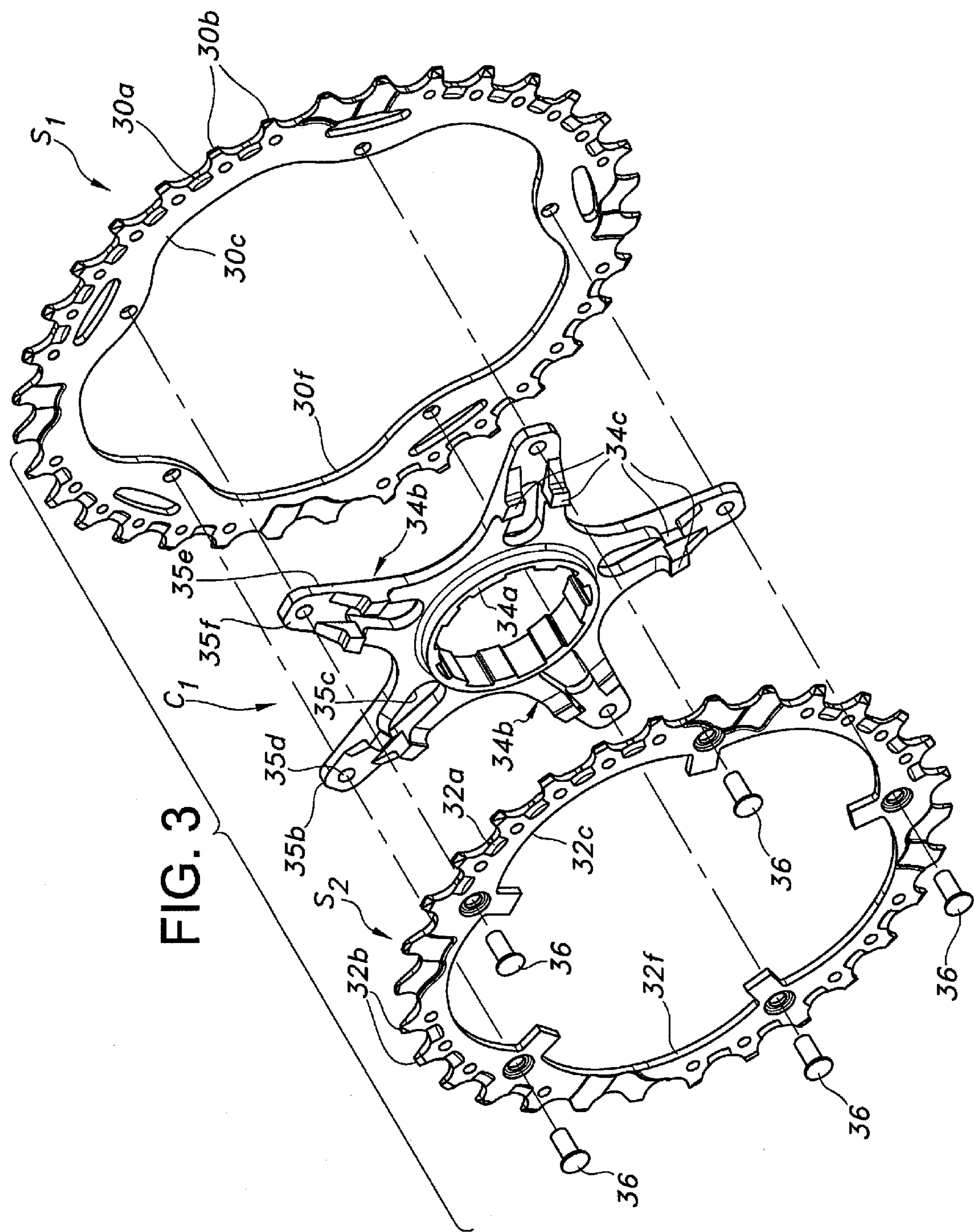
FIG. 3 is an exploded, outer perspective view of the first (largest) sprocket, the first sprocket carrier and the second (second largest) sprocket of the rear sprocket assembly illustrated in FIG. 2.
Figure 4:
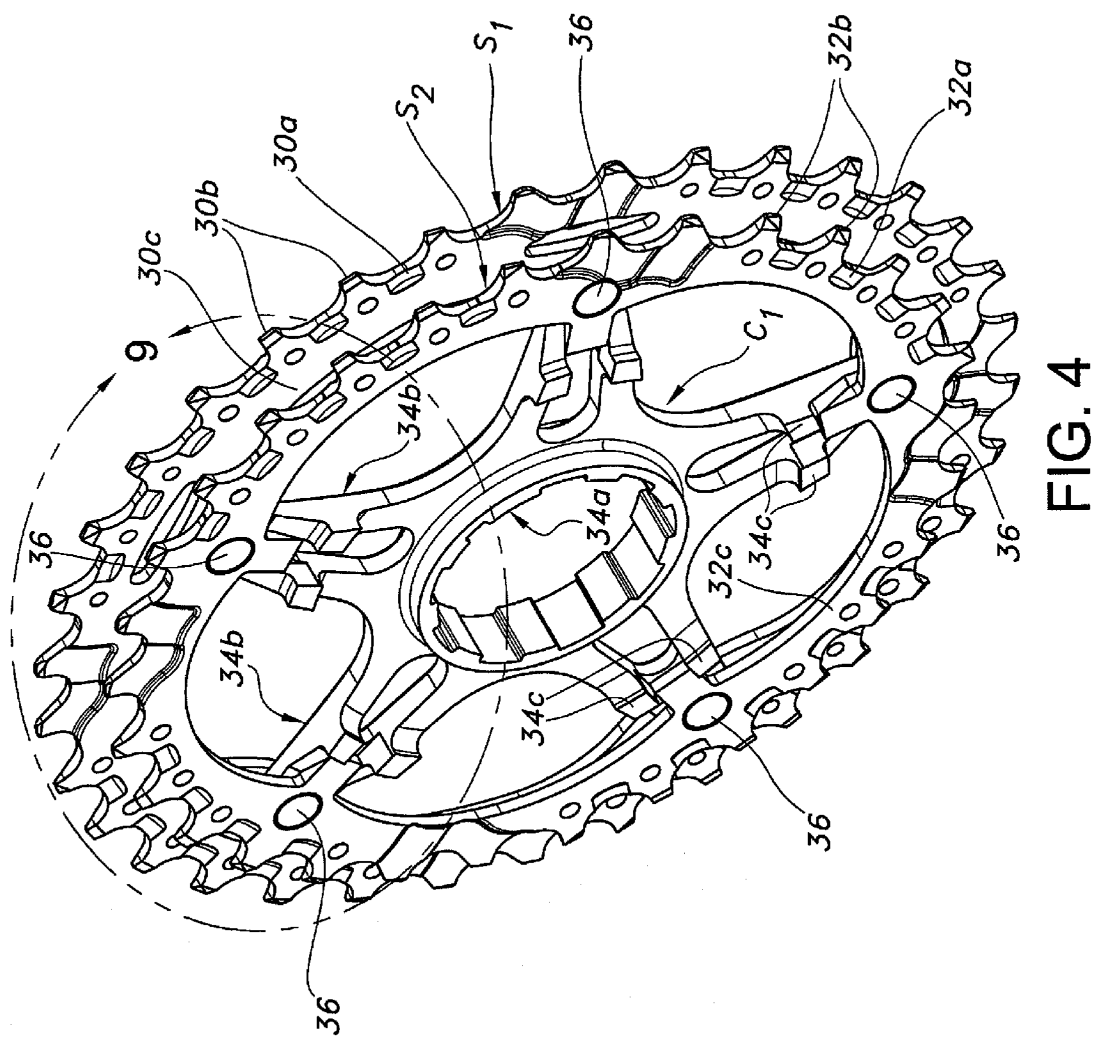
FIG. 4 is an assembled, enlarged outer perspective view of the first sprocket, the first sprocket carrier and the second sprocket illustrated in FIG. 3.
Figure 5:
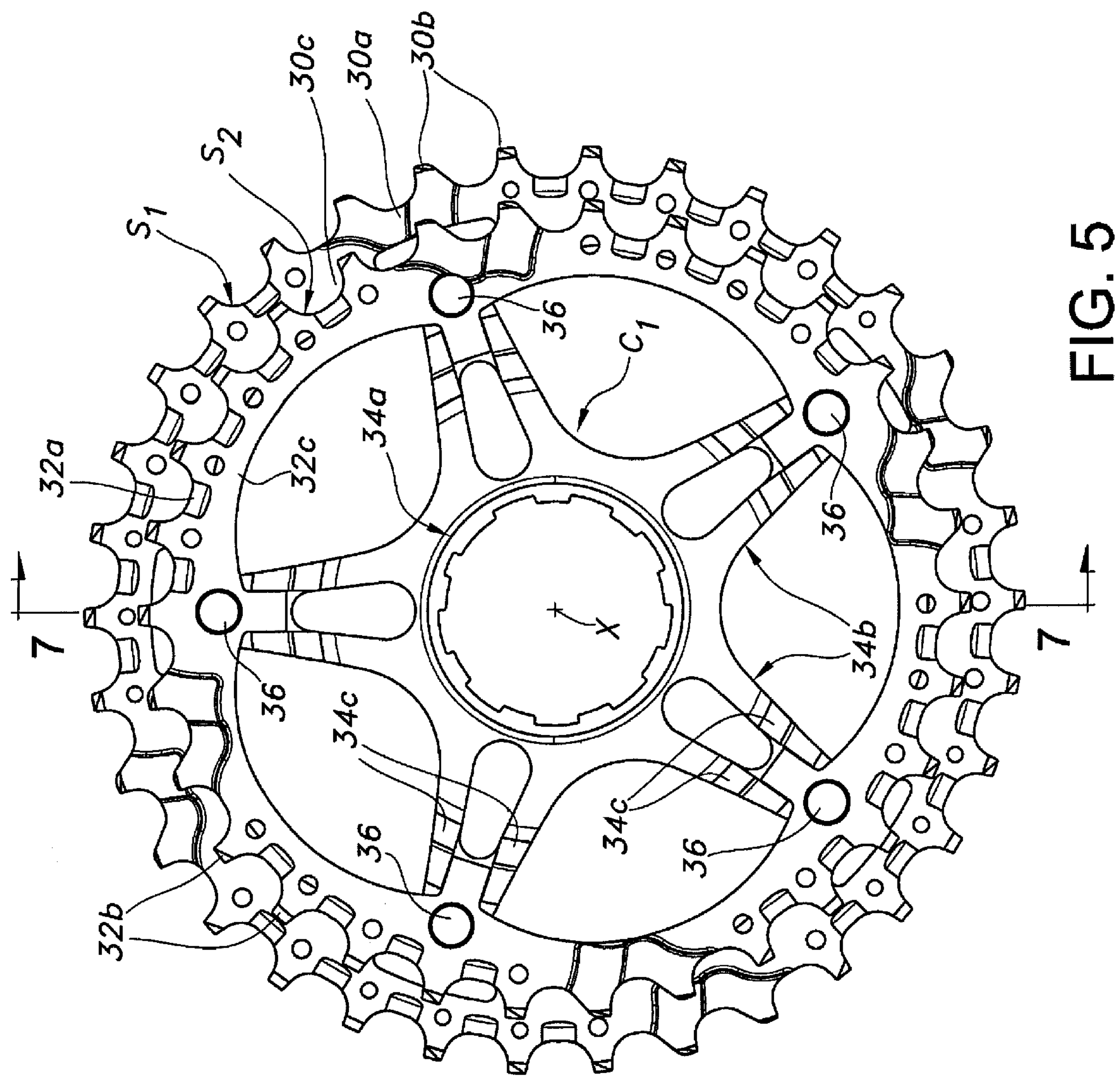
FIG. 5 is an outer axial elevational (laterally outside) view of the assembled structure illustrated in FIG. 4.
Figure 7:
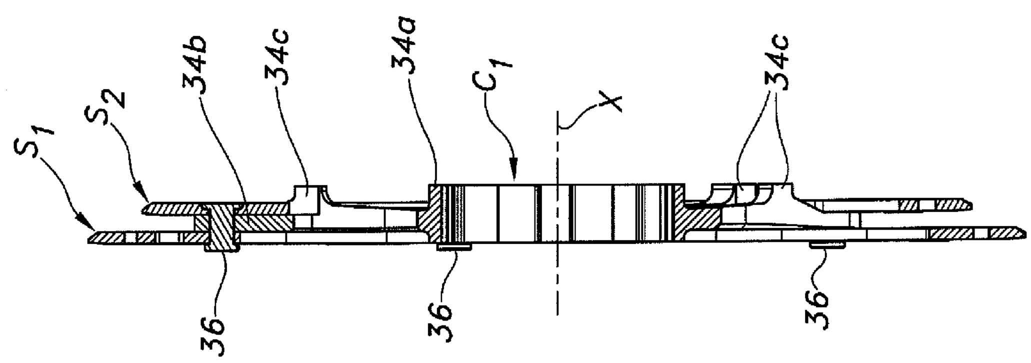
FIG. 7 is a cross-sectional view of the assembled structure illustrated in FIGS. 4-6, as seen along section line 7-7 of FIG. 5.
Figure 6:
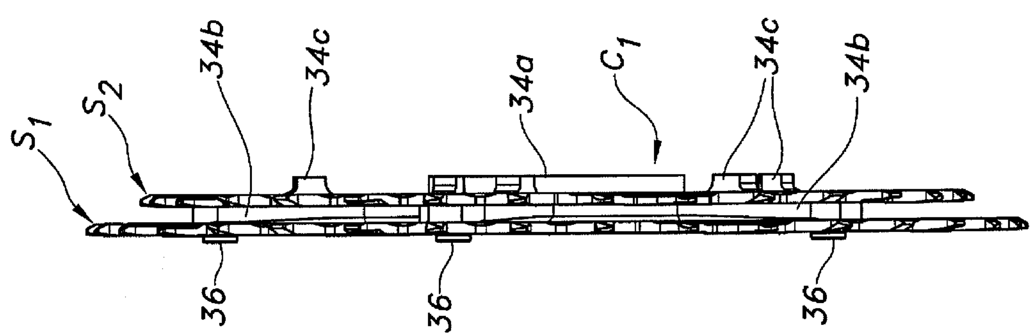
FIG. 6 is a left side (rear) elevational view of the assembled structure illustrated in FIG. 5.
Figure 8:
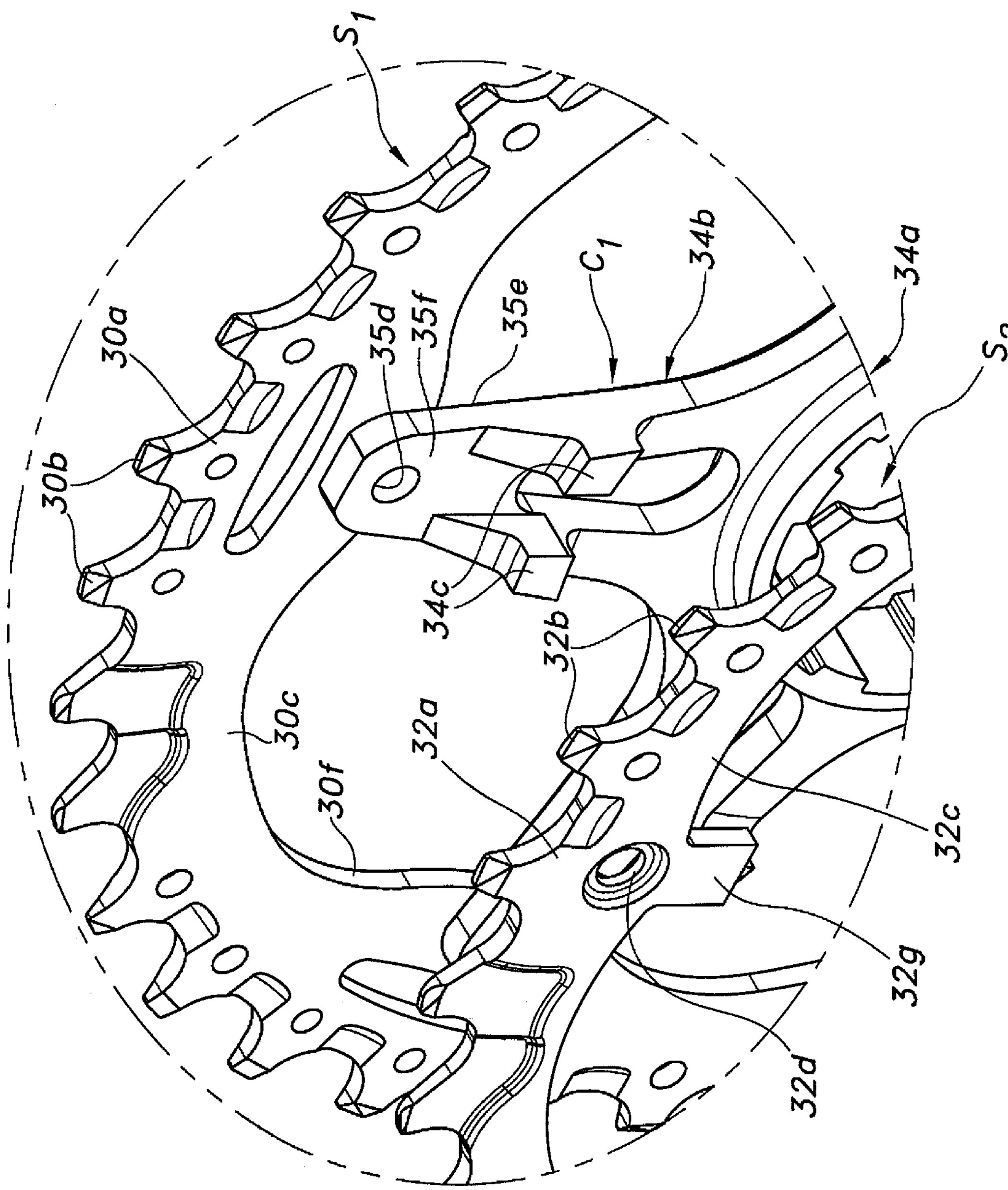
FIG. 8 is an enlarged, partial perspective view of the structure illustrated in FIGS. 3-7, but with the first sprocket disposed adjacent the sprocket carrier and the second sprocket spaced from the sprocket carrier prior to attachment with the rivets.
Figure 9:
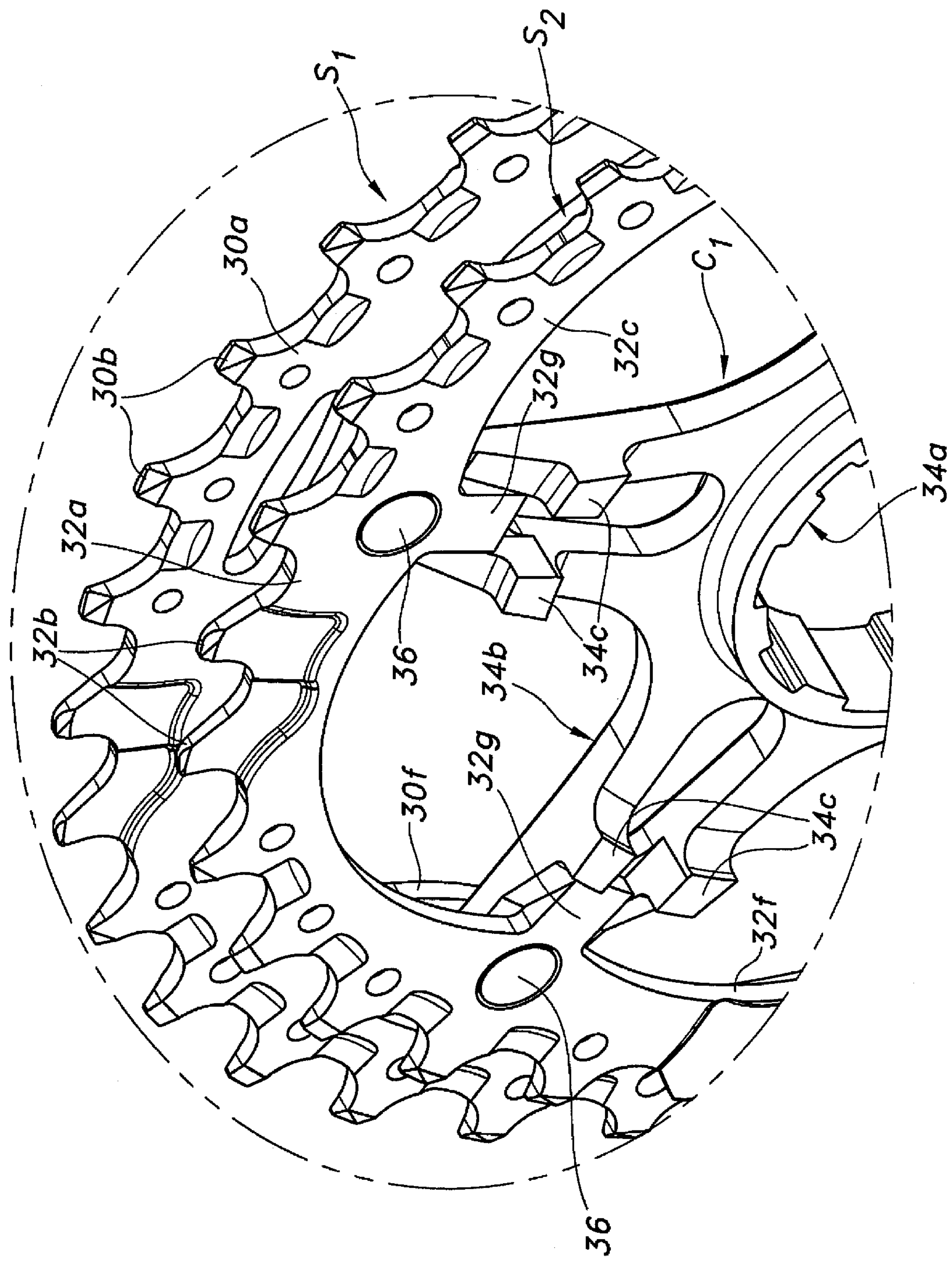
FIG. 9 is an enlarged, perspective view of the area of the assembled structure illustrated in FIG. 4 that is identified by the circle 9, after the first and second sprockets are attached to the sprocket carrier with the rivets.
Figure 10:
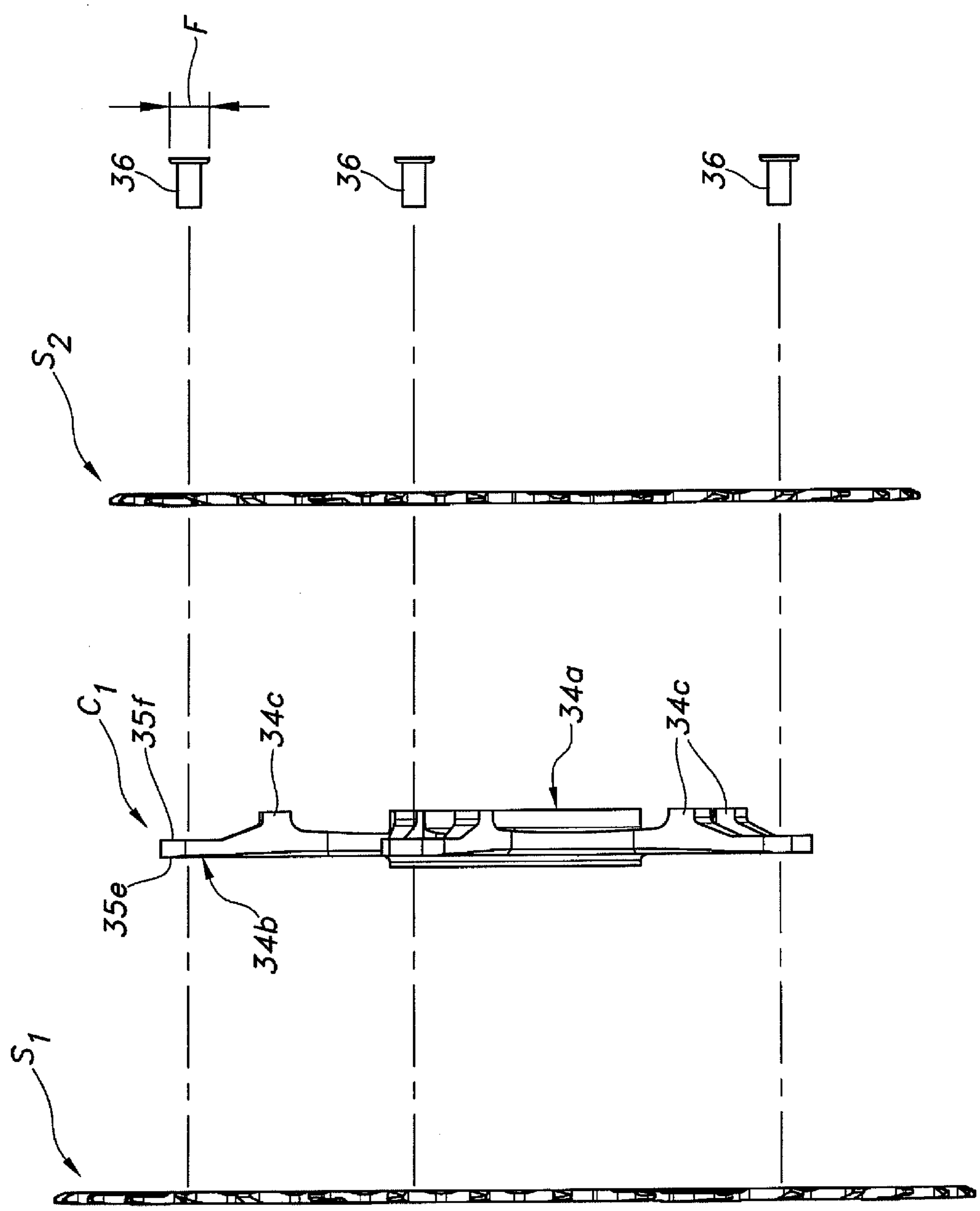
FIG. 10 is an exploded view of the structure illustrated in FIG. 6.
Figures 11, 12:
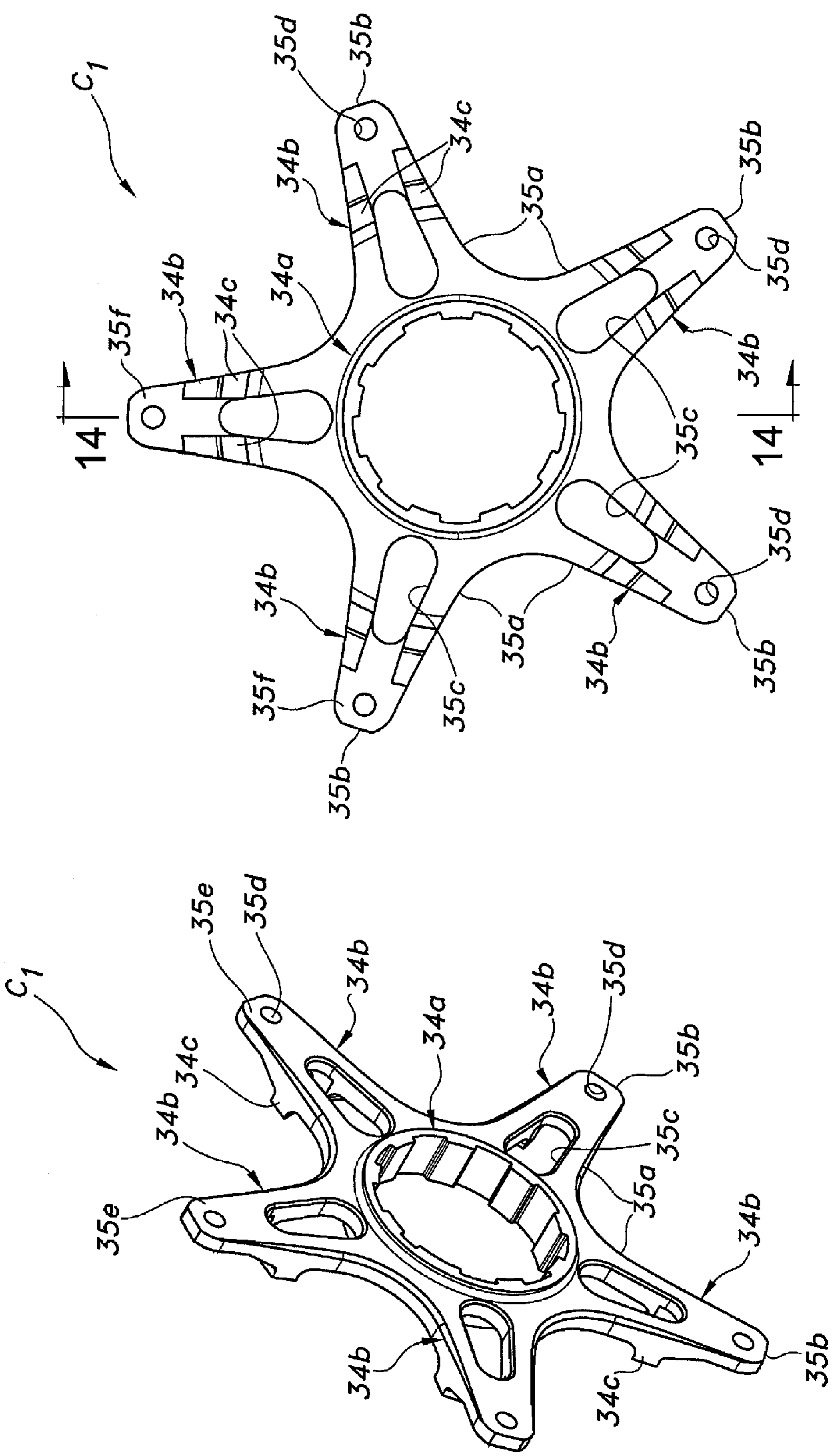
FIG. 11 is a reverse, inner perspective view of the sprocket carrier illustrated in FIGS. 3-9.
FIG. 12 is an outer axial elevational (laterally outside) view of the sprocket carrier illustrated in FIG. 11.
Figure 17:
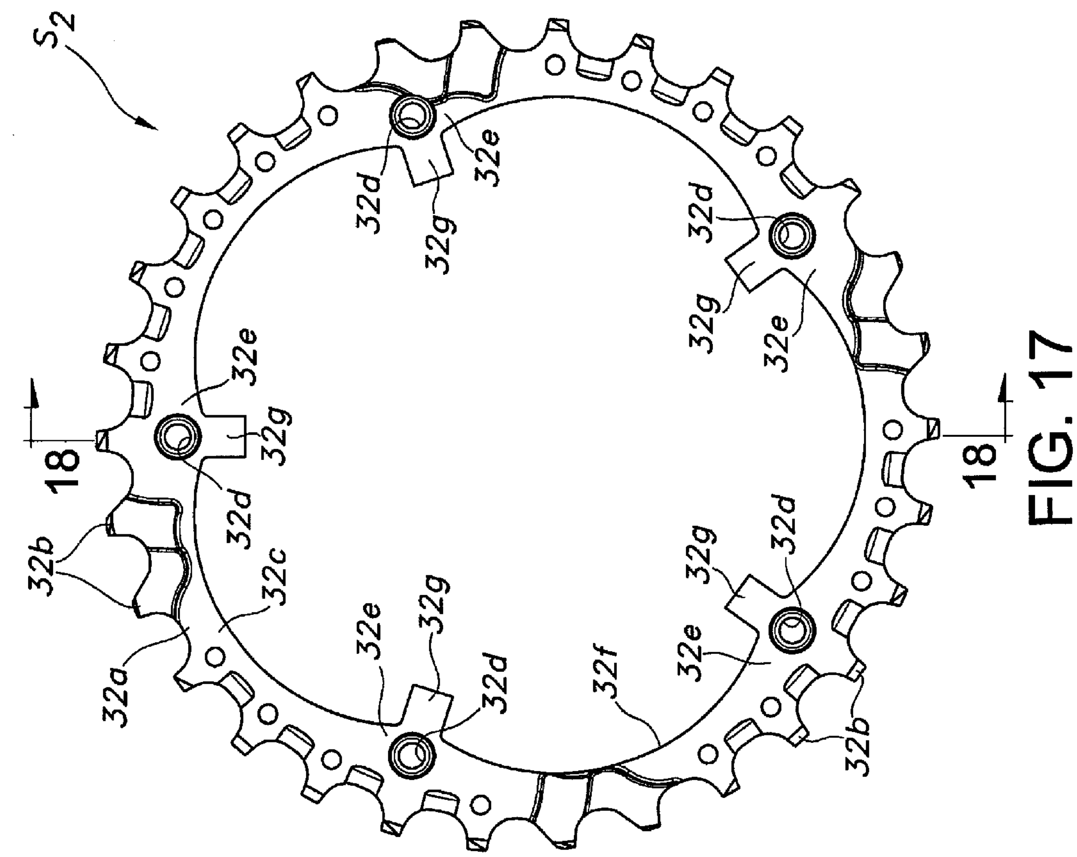
FIG. 17 is an outer axial elevational (laterally outside) view of the second sprocket illustrated in FIG. 16.
Figure 16:
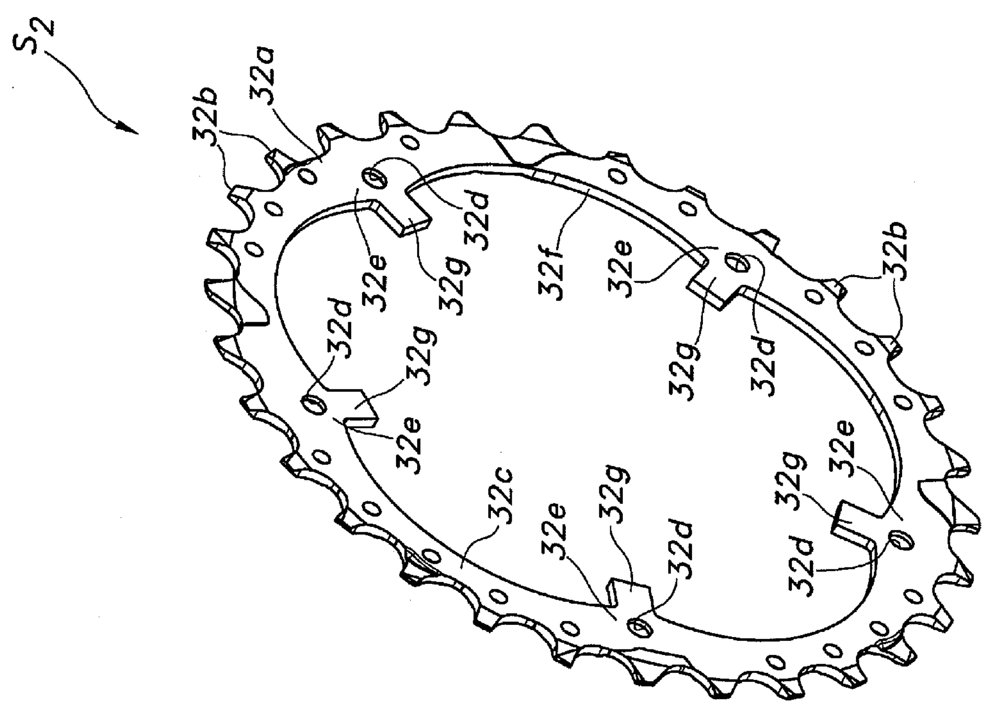
FIG. 16 is a reverse, inner perspective view of the second sprocket illustrated in FIGS. 3-9.
Figures 18, 19, 20:
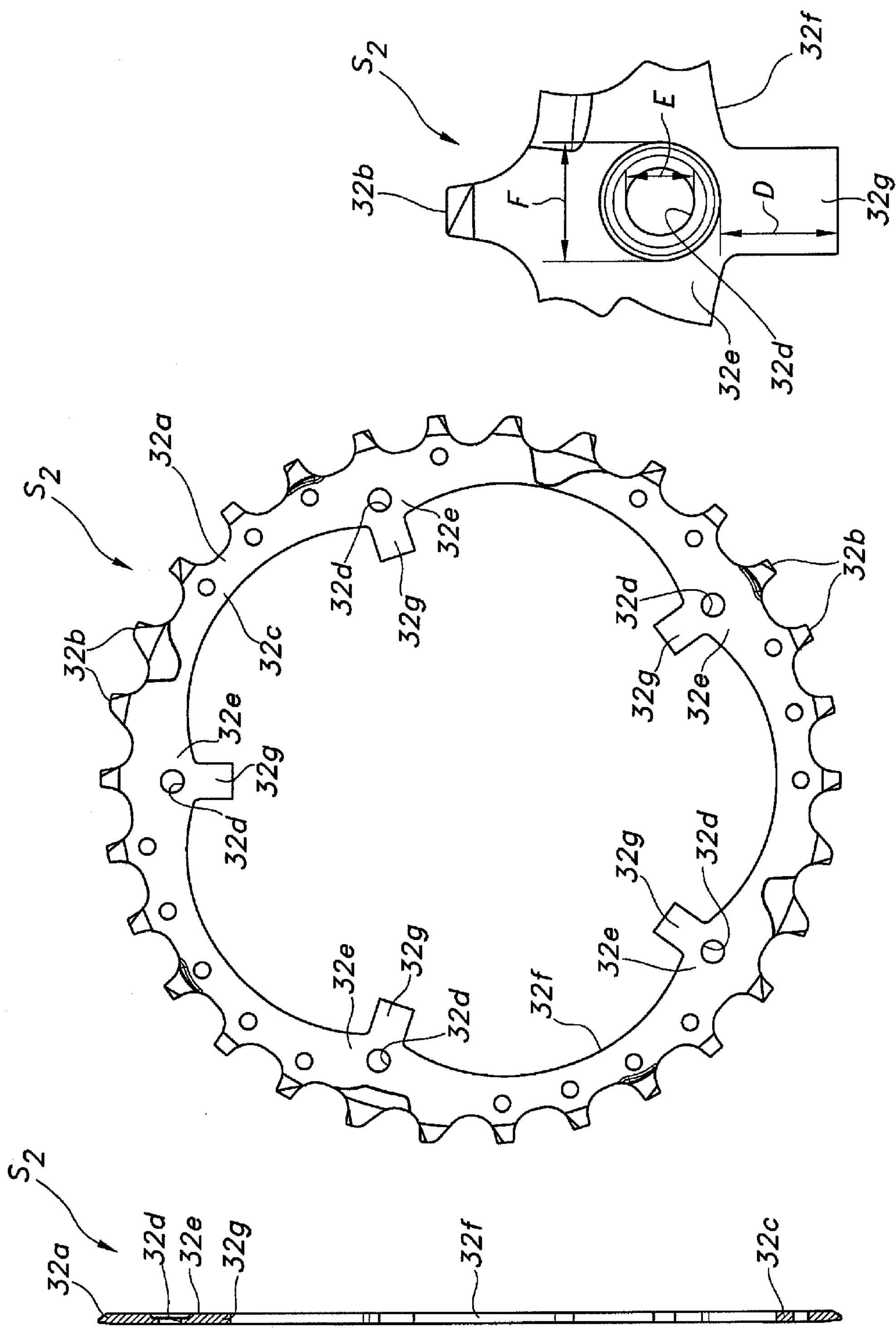
FIG. 18 is a cross-sectional view of the second sprocket illustrated in FIGS. 16-17, as seen along section line 18-18 of FIG. 17.
FIG. 19 is an inner axial elevational (laterally inner) view of the second illustrated in FIGS. 16-18.
FIG. 20 is an enlarged, outside elevational view of a portion of the second sprocket illustrated in FIG. 17.
Figures 21, 22:
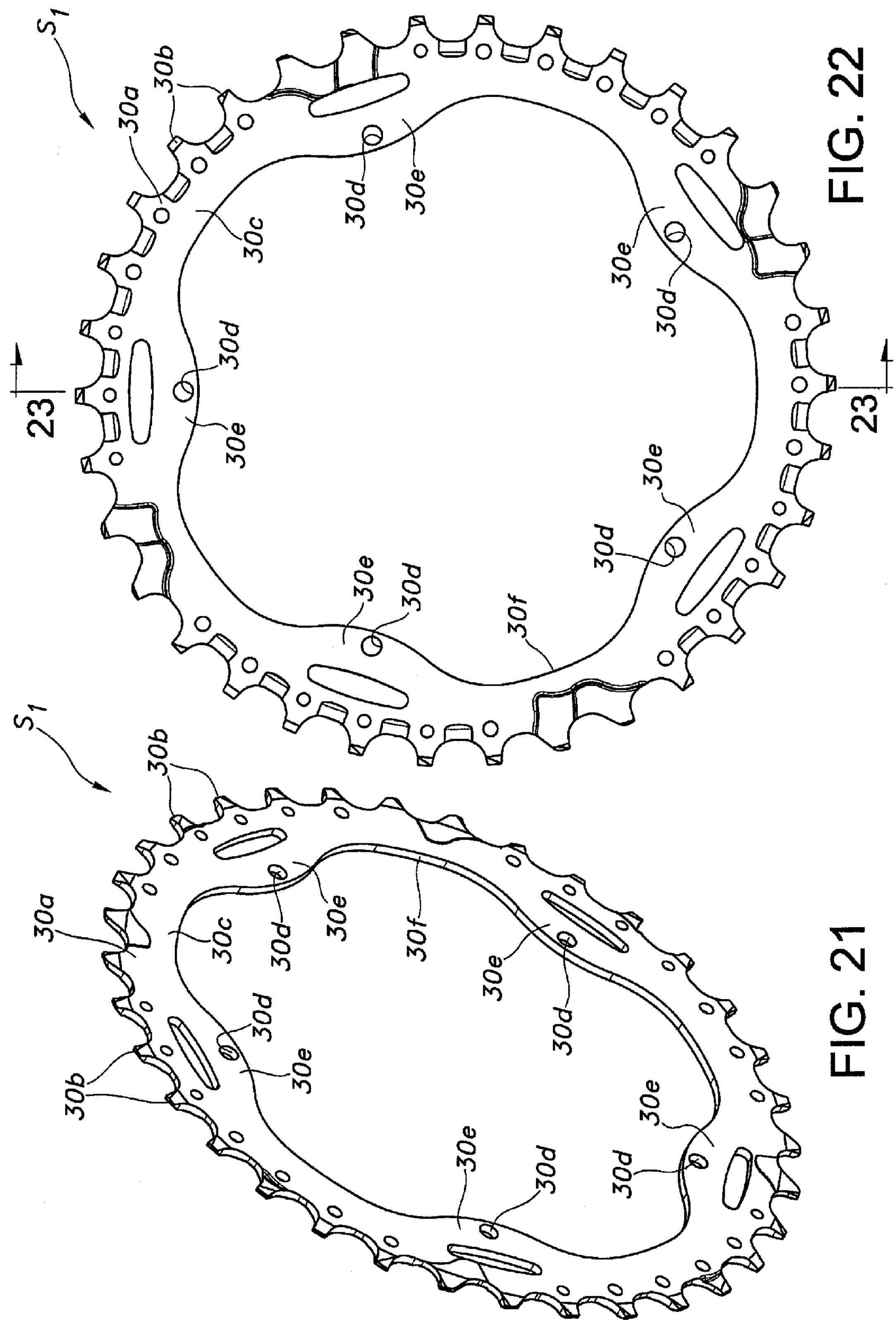
FIG. 21 is a reverse, inner perspective view of the first sprocket illustrated in FIGS. 3-9.
FIG. 22 is an outer axial elevational (laterally outside) view of the first sprocket illustrated in FIG. 21.

Referring initially to FIGS. 1 and 2, a conventional bicycle 10 is illustrated having a rear bicycle hub 11 with a rear multi-stage sprocket assembly 12 mounted on a freewheel 13 in accordance with the present invention. The bicycle 10 basically has a frame 14 with front and rear wheels 15 and 16 rotatably coupled thereto. A front fork 17 is coupled between the frame 14 and the front wheel 15 in a conventional manner. Turning a handlebar 18, which is fixedly coupled to the front fork 17, turns the front wheel 15. The rear wheel 16 is rotatably coupled to a rear portion of the frame 14 via the rear hub 11. The frame 14 also has a seat 19 adjustably coupled to the frame 14 and a drive train 20 for propelling the bicycle 10. The bicycle 10 is conventional except for selected parts of the drive train 20, as discussed below.

The drive train 20 basically includes the rear multi-stage sprocket assembly 12 of the present invention, a pair of pedals 21, a front multi-stage sprocket assembly 22 mounted to rotate with the pedals 21, and a chain 23 extending between the rear multi-stage sprocket assembly 12 and the front multi-stage sprocket assembly 22. As mentioned above, the rear sprocket assembly 12 is preferably coupled to the rear hub 11 via the freewheel 13. The rear multi-stage sprocket assembly 12 in the illustrated embodiment has nine sprockets $S_1$-$S_9$ that are mounted to the freewheel 13 of the rear hub 11 in a relatively conventional manner. The pedals 21 are coupled to the front multi-stage sprocket assembly 22 by a conventional crank set to transfer force from the rider to the chain 23. The force from the chain 23 is then selectively transferred to the rear wheel 16 via the rear hub 11 (e.g. via the rear sprocket assembly 12 and the freewheel 13 depending on the direction of rotation) in a conventional manner.

The drive train 20 is basically controlled by conventional front and rear shifting units (not shown) that control the lateral positions of front and rear derailleurs 27 and 28 in a conventional manner. Thus, when the rider is pedaling, the front and rear sprocket assemblies 22 and 12 are rotating to circulate the chain 23 due to the movement of the pedals 21. The shifting units can be actuated by the rider to control the position of the front and/or rear derailleurs 27 and/or 28. Thus, when the chain 23 is circulated in the forward (clockwise direction as seen in FIG. 1), the shifting units can be actuated to control the gear ratio of the drive train 20 by controlling the lateral position of the chain 23 via the derailleurs 27 and 28. The derailleurs 27 and 28 selectively apply a lateral force F inwardly/outwardly to the chain 23 to cause up/down shifts between the front and rear sprocket assemblies 22 and 12, respectively. The drive train 20 is basically conventional, except for the rear multi-stage sprocket assembly 12. Thus, the drive train 20 will not be discussed and/or illustrated in detail herein, except as related to the rear multi-stage sprocket assembly 12.

Since the various parts of the bicycle 10 and most of the parts of the drive train 20 are well known in the bicycle art, these parts of the bicycle 10 and the drive train 20 will not be discussed or illustrated in detail herein, except as they are modified in accordance with the present invention. Moreover, various conventional bicycle parts such as brakes, additional sprockets, etc., which are not illustrated and/or discussed in detail herein, can be used in conjunction with the present invention.

As used herein, the terms "forward, rearward, above, below, lateral and transverse" refer to those directions of a bicycle in its normal riding position, to which the rear sprocket assembly 12 is attached. Accordingly, these terms, as utilized to describe the rear sprocket assembly 12 in the claims, should be interpreted relative to bicycle 10 in its normal riding position. However, the terms "down shift" and "up shift" as used herein in reference to the rear sprocket assembly 12 should be interpreted to mean a shift from smaller to larger sprocket and from larger to smaller sprocket, respectively, as shown in FIG. 2.

Referring now to FIGS. 2-10, 26 and 27, the rear sprocket assembly 12 in accordance with the present invention will now be discussed. In the illustrated embodiment, the rear sprocket assembly 12 is a nine-stage sprocket assembly with sprockets $S_1$-$S_9$ being spaced from each other at predetermined intervals. Each of the sprockets $S_1$-$S_9$ are preferably ring-shaped members that form a continuous annular, one-piece member. The sprockets $S_1$-$S_9$ are fixedly mounted on the freewheel 13 of the rear hub 11 such that the sprockets $S_1$-$S_9$ rotate together about a center hub rotation axis X. The sprockets $S_1$-$S_9$ typically rotate together in a forward rotational direction (e.g., in a clockwise direction as viewed in FIG. 1) when the rider is pedaling in a forward (clockwise) direction to propel the bicycle 10 in a forward direction as best understood from FIG. 1. The sprockets $S_1$-$S_9$ are preferably constructed of a lightweight, rigid material such as a metallic material. The sprockets $S_1$-$S_9$ can be considered first-ninth sprockets, respectively.

The rear sprocket assembly 12 is adapted to engage with the drive chain 23, which is a conventional style bicycle chain as seen in FIG. 1. Thus, the drive chain 23 is a continuous loop that has a plurality of inner link plates and a plurality of outer link plates that are pivotally connected to each other by articulation pins and rollers. During a chain shifting process, the chain 23 is shifted from one of the sprocket $S_1$-$S_9$ to the next adjacent sprocket $S_1$-$S_9$ by the rear derailleur 28 moving the chain 23 in an axial direction relative to the axis of rotation X of the sprockets $S_1$-$S_9$.

An up shift occurs when the chain 23 is moved from a larger sprocket to the next smaller sprocket, while a down shift occurs when the chain 23 is shifted from a smaller sprocket to the next larger sprocket. The sprockets $S_1$-$S_9$ are designed so that the chain 23 can execute smooth down shifting and up shifting motions. Each of the sprockets $S_1$-$S_9$ has a different number of teeth. For instance, one example of a tooth number arrangement for the sprockets $S_1$-$S_9$ is a 34T, 30T, 26T, 23T, 20T, 17T, 15T, 13T, 11T arrangement. However, it will be apparent to those skilled in the bicycle art from this disclosure that other tooth number arrangements are possible.

In the illustrated embodiment, the sprockets $S_1$-$S_9$ can have either uniform or varying thicknesses as well as uniform or varying axial spaces formed therebetween. The sprockets $S_1$-$S_9$ preferably have thicknesses between about 1.6 millimeters to about 2.2 millimeters, e.g. about 1.8 millimeters. The axial spacing between the sprockets $S_1$-$S_9$ is preferably between about 3.6 millimeters to about 3.9 millimeters, e.g. about 3.68 millimeters. A pair of conventional spacers T are utilized in a conventional manner between the sprockets $S_7$-$S_9$ to create the optimal spacing between the sprockets $S_7$-$S_9$. Thus, the sprockets $S_7$-$S_9$ are individual ring-shaped sprockets having internally splined openings that are mounted directly to the freewheel 13 of the rear hub 11. On the other hand, the sprockets $S_1$-$S_6$ are mounted on sprocket carriers having integrated spacers such that the axial spaces between the sprockets $S_1$-$S_9$ can be set to optimize shifting of the chain 23 therebetween.

Specifically, the sprockets $S_1$ and $S_2$ are mounted on an outer periphery of a first sprocket carrier $C_1$ to form a first sprocket subassembly. The first sprocket carrier $C_1$ creates an optimal spacing between the sprockets $S_1$ and $S_2$ as well as an optimum spacing between the sprockets $S_2$ and $S_3$. The sprockets $S_3$ and $S_4$ are mounted on an outer periphery of a second sprocket carrier $C_2$ to form a second sprocket subassembly similar to the first sprocket subassembly. The second sprocket carrier $C_2$ creates an optimal spacing between the sprockets $S_3$ and $S_4$ as well as an optimum spacing between the sprockets $S_4$ and $S_5$. The sprockets $S_5$ and $S_6$ are mounted on an outer periphery of a third sprocket carrier $C_3$ to form a third sprocket subassembly similar to the first and second sprocket subassemblies. The third sprocket carrier $C_3$ creates an optimal spacing between the sprockets $S_5$ and $S_6$ as well as an optimum spacing between the sprockets $S_6$ and $S_7$. The sprocket carriers $C_1$-$C_3$ have internally splined openings that are mounted directly to the freewheel 13 of the rear hub 11 in a conventional manner, as explained below. The spacing and thickness of the sprockets $S_1$-$S_9$ can be understood from FIG. 2.

Referring to FIGS. 2-10 and 21-25, the first sprocket $S_1$ is an annular ring shaped member that basically includes a first chain engaging portion 30*a* with a plurality of first teeth 30*b*, and a first attachment portion 30*c* with a plurality of through holes 30*d*. The through holes 30*d* are preferably circular shaped. The attachment portion 30*c* has a generally ring-shaped configuration with the chain engaging portion 30*a* extending radially outwardly thereof. In the illustrated embodiment, the attachment portion 30*c* has a plurality (i.e., five) circumferentially equally spaced attachment sections 30*e*.

An inner peripheral edge 30*f* of the attachment portion 30*c* bulges radially inwardly toward the rotation axis X at the attachment sections 30*e*. The inner peripheral edge 30*f* extends axially between two opposed parallel surfaces of the attachment portion 30*c*. Each of the attachment sections 30*e* preferably has one of the through holes 30*d* extending axially therethrough adjacent the inner peripheral edge 30*f*. A circumferentially elongated weight saving cutout is preferably formed in each attachment section in an area disposed radially between the respective through opening 30*d* and the teeth 30*b*. Additional, smaller (circular) weight saving cutouts are also preferably disposed circumferentially about first sprocket $S_1$, as shown in FIGS. 2-10 and 21-25.

Referring to FIGS. 2-10 and 16-20, the second sprocket $S_2$ is an annular ring shaped member that basically includes a second chain engaging portion 32*a* with a plurality of second teeth 32*b* and a second attachment portion 32*c* with a plurality of through holes 32*d*. The through holes 32*d* are preferably circular shaped, partially stepped through holes. The attachment portion 32*c* has a generally ring-shaped configuration with the chain engaging portion 32*a* extending radially outwardly thereof. In the illustrated embodiment, the attachment portion 32*c* has a plurality (i.e., five) circumferentially equally spaced attachment sections 32*e*. An inner peripheral edge 32*f* of the attachment portion 32*c* projects radially inwardly toward the rotation axis X at the attachment sections 32*e* to form a plurality of rectangular shaped tabs 32*g*. The inner peripheral edge 32*f* extends axially between two opposed parallel surfaces of the attachment portion 32*c*. Each of the attachment sections 32*e* preferably has one of the through holes 32*d* extending axially therethrough.

The tabs 32*g* are aligned with the through holes 32*d* in the circumferential direction. In other words, each tab 32*g* circumferentially overlaps one of the holes 32*d* as viewed in a radial direction along the tab 32*g* (i.e. as viewed along an imaginary line passing through the tab 32*g* and the rotation axis X). The through holes 32*d* are preferably disposed radially outwardly of the tabs 32*g*. The inner peripheral edge 32*f* has five curved sections circumferentially disposed between the tabs 32*g* in an alternating manner. Each curved section has a radius of curvature smaller than the distance between the curved section and the rotation axis X. Thus, the curved sections of the inner peripheral edge 32*f* project radially inwardly in areas adjacent to the tabs 32*g*. Accordingly, the holes 32*d* are disposed radially outwardly of the parts of the curved sections of the inner peripheral edge 32*f* adjacent to the tabs 32*g*.

The inner peripheral edge 32*f* along the free ends of the tabs 32*g* is preferably disposed radially inwardly of the through holes 32*d* by a distance D larger than a minimum diameter E of the through holes. More preferably, the inner peripheral edge 32*f* along the free ends of the tabs 32*g* is preferably disposed radially inwardly of the through holes 32*d* by a distance D about twice the minimum diameter E of the through holes. In other words, the inner peripheral edge 32*f* along the free ends of the tabs 32*g* is preferably disposed significantly radially inwardly of the through holes 32*d* to contribute to minimizing deflections, as explained below. Also, the inner peripheral edge 32*f* along the free ends of the tabs 32*g* is preferably spaced radially inwardly of the through holes 32*d* by a distance D larger than a radial space between the through holes 32*d* and the second roots disposed between the second teeth 32*b*.

Referring now to FIGS. 2-15, the first sprocket carrier $C_1$ includes an annular mounting boss 34*a* and a plurality of attachment members (support arms) 34*b* extending radially outwardly from the mounting boss 34*a* in directions substantially perpendicular to the rotation axis X. Preferably, the attachment members 34*b* and the mounting boss 34*a* are constructed of lightweight rigid materials such as a metallic material. The attachment members 34*b* are preferably integrally formed with the mounting boss 34*a* as a one-piece unitary member using conventional manufacturing techniques such as casting and/or machining. The sprocket carrier $C_1$ is preferably formed from a material having a specific gravity lower than the specific gravity of the material of the sprockets $S_1$ and $S_2$.

The annular mounting boss 34*a* has a tubular configuration with an internally splined surface that mates with the outer portion of the freewheel 13 in a sliding, non-rotatable arrangement in a conventional manner. In the illustrated embodiment, the sprocket carrier $C_1$ includes five circumferentially equally spaced attachment members 34*b* to form a substantially star-shaped configuration. Each of the attachment members 34*b* includes an inner end portion 35*a* non-movably fixed with the mounting boss and an outer end portion 35*b* spaced outwardly from the inner end portion 35*a*. Each of the attachment members 34*b* further includes a cutout 35*c* extending between the inner and outer end portions 35*a* and 35*b*. The attachment sections 30*e* and 32*e* of the sprockets $S_1$ and $S_2$ are attached to opposite axial sides of the outer end portions 35*b* using a plurality of fasteners 36. The axial length of the mounting boss 34*c* and the axial position of the outer end portions 35*b* are configured to cooperate with the freewheel 13 and the second sprocket carrier $C_2$ supporting the sprockets $S_3$ and $S_4$ to provide optimum spacing, as mentioned above.

Specifically, each outer end portion 35*b* has a through hole 35*d* extending between oppositely facing (parallel) axial surfaces 35*e* and 35*f*. The axially facing surface 35*e* faces in a first axial direction (laterally inwardly toward a center plane of the bicycle 10) toward the first sprocket $S_1$, while the axially facing surface 35*f* faces in a second axial direction (laterally outwardly away from the center plane of the bicycle 10) toward the second sprocket $S_2$ that is opposite to the first axial direction. The fasteners 36, such as rivets, are received in the through holes 35*d* to attach the attachment sections 30*e* and the attachment sections 32*e* to the outer end portions 35*b*. In the illustrated embodiment, a single common fastener, such as a rivet is used to attach one of the attachment sections 30*e* and one of the attachment sections 32*e* to one of the outer end portions 35*b*.

As mentioned above, the distance D is measured between the through holes 32*d* and the inner peripheral edge 32*f* of the second sprocket $S_2$ along the free ends of the tabs 32*g*. The distance D is at least as large as one-half of a maximum transverse dimension F of the fastener 36 measured in a direction perpendicular to the rotation axis X. More preferably, the distance D is at least as large as the maximum transverse dimension F of the fastener 36 measured in a direction perpendicular to the rotation axis X. In the illustrated embodiment, the maximum transverse dimension F of the fastener 36 corresponds to the maximum diameter of each of the through holes 32*d*. The maximum diameter of the through holes 32*d* is measured across the recessed (stepped) section of each through hole 32*d* in a direction perpendicular to the rotation axis X.

In this embodiment, the sprocket carrier $C_1$ includes a plurality of space maintaining sections 34*c* extending axially towards the adjacent sprocket $S_3$. In particular, each of the each outer end portions 35*b* includes a pair of space maintaining sections 34*c* circumferentially spaced from each other to form a slot therebetween, which is configured to receive one of the tabs 32*g* in a mating arrangement. The pair of space maintaining sections 34*c* of each outer end portion 35*b* form parts of a space maintaining projection of each outer end portion 35*b*. In this embodiment, the space maintaining sections 34*c* are integrally formed as a one-piece, unitary member with the attachment members 34*b* of the sprocket carrier $C_1$.

Each of the space maintaining sections 34*c* has a free end that is axially spaced from the adjacent sprocket $S_3$ by a predetermined spacing. Preferably, the predetermined spacing is 0.1 millimeters or less. Of course, the predetermined spacing can be more or less as needed and/or desired. If the predetermined spacing becomes too large, then the amount of possible deflection of the sprockets $S_1$ and/or $S_2$ will become greater. Thus, it is preferable to keep the predetermined spacing as small as possible. In fact, the predetermined spacing can be zero such that the free ends of the space maintaining sections 34*c* contact the sprocket $S_3$. In this embodiment, the free ends of the space maintaining sections 34*c* are disposed on opposite circumferential sides of the fasteners, which connect the sprockets $S_3$ and $S_4$ to the sprocket carrier $C_2$. The space maintaining sections 34*c* are located radially outwardly of the radially innermost end (the mounting boss 34*a*) of the sprocket carrier $C_1$.

The axial end surfaces of the space maintaining sections 34*c* face in the second axial direction. The axial end surfaces of the space maintaining sections 34*c* are preferably located slightly radially inwardly of the inner peripheral edge 32*f* of the second sprocket $S_2$ along the free ends of the tabs 32*g*. However, the space maintaining sections 34*c* are elongated in the radial direction to form mating slots for receiving the tabs 32*g*. Thus, the space maintaining sections 34*c* also circumferentially hold the tabs 32*g*, as best understood from FIGS. 8 and 9.

In the illustrated embodiment, the tabs 32*g* contact the axially facing surfaces 35*f* along the entire opposed surfaces of the tabs. In any case, preferably a majority of the tabs 32*g* contact the axially facing surfaces 35*f*. Thus, the inner peripheral edge 32*f* of the second sprocket $S_2$ along the free ends of the tabs 32*g* at least partially overlaps, and preferably completely overlaps, the second axially facing surfaces 35*f* as viewed in a direction parallel to the rotation axis X. Even though the tabs 32*g* contact the second axially facing surfaces 35*f* in the illustrated embodiment, it will be apparent to those skilled in the art from this disclosure that the tabs 32*g* and the second axially facing surface can be configured as opposed surfaces that do not contact each other all of the time, i.e., which only contact each other when the sprocket $S_2$ begins to deflect laterally outwardly.

Figure 26:
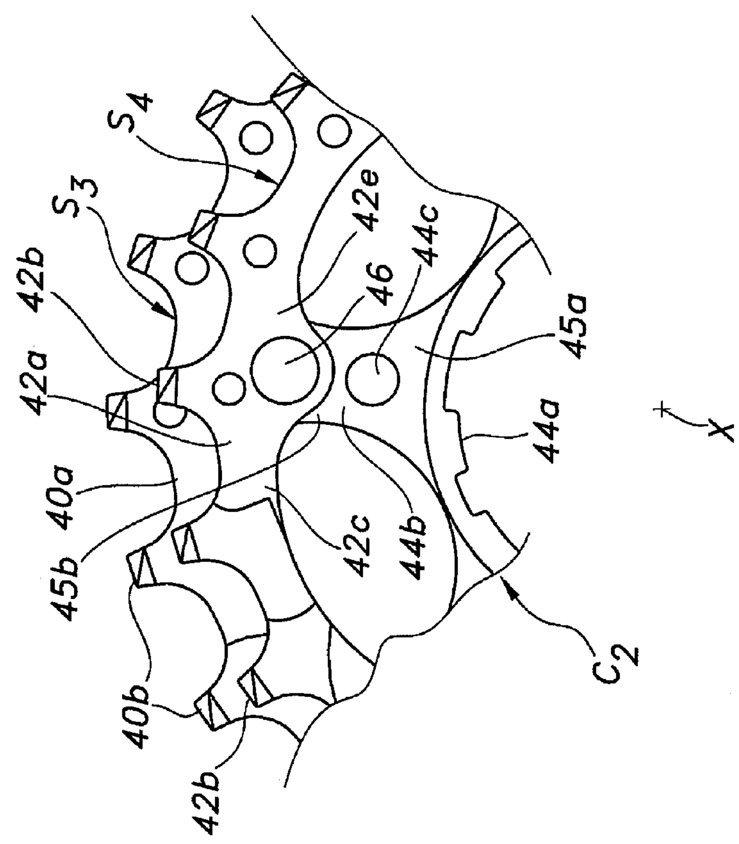
FIG. 26 is a partial, outside elevational view of the third and fourth sprockets attached to the second carrier of the multiple rear sprocket assembly illustrated in FIG. 2.

Referring now to FIGS. 2 and 26, the second sprocket subassembly, which includes the sprockets $S_3$ and $S_4$ mounted on an outer periphery of a second sprocket carrier $C_2$ will now be explained. The second sprocket subassembly has a configuration similar to the first sprocket subassembly, which includes the sprockets $S_1$ and $S_2$ mounted on an outer periphery of a first sprocket carrier $C_1$. Specifically, the sprockets $S_3$ and $S_4$ are conventional annular ring shaped sprockets similar to the sprocket $S_1$, except for their size and number of teeth (e.g., 26T and 23T, respectively). Accordingly, the sprockets $S_3$ and $S_4$ will not be explained and/or illustrated in detail herein for the sake of brevity. However, it will be apparent to those skilled in the art from this disclosure that the descriptions and illustrations of the sprocket $S_1$ also apply to the sprockets $S_3$ and $S_4$, except as explained and illustrated herein.

The sprocket $S_3$ is an annular ring shaped member that basically includes a third chain engaging portion 40*a* with a plurality of third teeth 40*b*, and a third attachment portion 40*c* with a plurality of through holes 40*d*. The through holes 40*d* are preferably circular shaped. The attachment portion 40*c* has a generally ring-shaped configuration with the chain engaging portion 40*a* extending radially outwardly thereof. In the illustrated embodiment, the attachment portion 40*c* has a plurality (i.e., five) circumferentially equally spaced attachment sections 40*e* with one of the through holes 40*d* formed in each attachment section 40*e*. Thus, the sprocket $S_3$ can be attached to the sprocket carrier $C_2$, as explained below.

The sprocket $S_4$ is an annular ring shaped member that basically includes a fourth chain engaging portion 42*a* with a plurality of fourth teeth 42*b*, and a fourth attachment portion 42*c* with a plurality of through holes 42*d*. The through holes 42*d* are preferably circular shaped. The attachment portion 42*c* has a generally ring-shaped configuration with the chain engaging portion 42*a* extending radially outwardly thereof. In the illustrated embodiment, the attachment portion 42*c* has a plurality (i.e., five) circumferentially equally spaced attachment sections 42*e* with one of the through holes 42*d* formed in each attachment section 42*e*. Thus, the sprocket $S_4$ can be attached to the sprocket carrier $C_2$ as explained below.

The sprocket carrier $C_2$ is similar to the sprocket carrier $C_1$. Thus, the sprocket carrier $C_2$ includes an annular mounting boss 44*a* and a plurality of attachment members (support arms) 44*b* extending radially outwardly from the mounting boss 44*a* in directions substantially perpendicular to the rotation axis X. Preferably, the attachment members 44*b* and the mounting boss 44*a* are constructed of lightweight rigid materials such as a metallic material. The attachment members 44*b* are preferably integrally formed with the mounting boss 44*a* as a one-piece unitary member using conventional manufacturing techniques such as casting and/or machining. The sprocket carrier $C_2$ is preferably formed from a material having a specific gravity lower than the specific gravity of the material of the sprockets $S_3$ and $S_4$.

The annular mounting boss 44*a* has a tubular configuration with an internally splined surface that mates with the outer portion of the freewheel 13 in a sliding, non-rotatable arrangement in a conventional manner. In the illustrated embodiment, the sprocket carrier $C_2$ includes five circumferentially equally spaced attachment members 44*b* to form a substantially star-shaped configuration (not shown) similar to the sprocket carrier $C_1$. Each of the attachment members 44*b* includes an inner end portion 45*a* non-movably fixed with the mounting boss and an outer end portion 45*b* spaced outwardly from the inner end portion 45*a*. The attachment sections 40*e* and 42*e* of the sprockets $S_3$ and $S_4$ are attached to opposite axial sides of the outer end portions 45*b* using a plurality of fasteners 46, such as rivets. The fasteners 46 can be identical to the fasteners 36 or different from the fasteners 36. The axial length of the mounting boss 44*c* and the axial position of the outer end portions 45*b* are configured to cooperate with the freewheel 13, the second sprocket carriers $C_1$ and $C_3$, the sprockets $S_1$-$S_9$ and the spacers T to provide optimum spacing, as mentioned above.

In this embodiment, the sprocket carrier $C_2$ includes a plurality of space maintaining projections 44*c* extending axially towards the adjacent sprocket $S_5$. In particular, each of the each outer end portions 45*b* includes a space maintaining projection 44*c*. In this embodiment, the space maintaining projections 44*c* are integrally formed as a one-piece, unitary member with the attachment members 44*b* of the sprocket carrier $C_2$. Each of the space maintaining projections 44*c* has a free end that is axially spaced from the adjacent sprocket $S_5$ by a predetermined spacing. Preferably, the predetermined spacing is 0.1 millimeters or less. Of course, the predetermined spacing can be more or less as needed and/or desired. If the predetermined spacing becomes too large, then the amount of possible deflection of the sprockets $S_3$ and/or $S_4$ will become greater. Thus, it is preferable to keep the predetermined spacing as small as possible. In fact, the predetermined spacing can be zero such that the free ends of the space maintaining projections 44*c* contact the sprocket $S_5$. In this embodiment, the free ends of the space maintaining projections 44*c* are aligned with the fasteners, which connect the sprockets $S_5$ and $S_6$ to the sprocket carrier $C_3$. The space maintaining projections 44*c* are located radially outwardly of the radially innermost end (the mounting boss 44*a*) of the sprocket carrier $C_2$.

Figure 27:
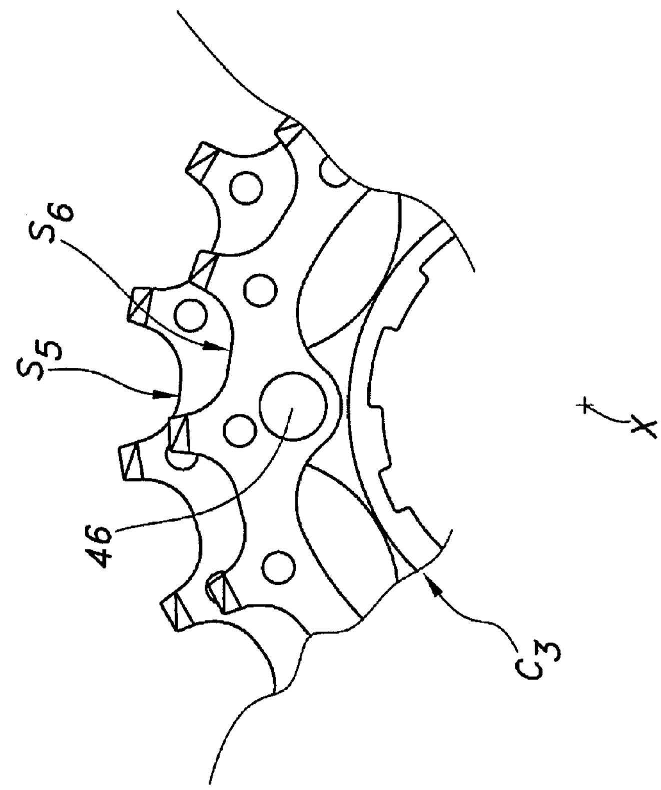
FIG. 27 is a partial, outside elevational view of the fifth and sixth sprockets attached to the third carrier of the multiple rear sprocket assembly illustrated in FIG. 2.

Referring now to FIGS. 2 and 27, the third sprocket subassembly, which includes the sprockets $S_5$ and $S_6$ mounted on an outer periphery of a third sprocket carrier $C_3$ will now be explained. The third sprocket subassembly has a configuration similar to the second sprocket subassembly, which includes the sprockets $S_3$ and $S_4$ mounted on an outer periphery of a second sprocket carrier $C_2$. Specifically, the sprockets $S_5$ and $S_6$ are conventional annular ring shaped sprockets similar to the sprockets $S_3$ and $S_4$, except for their size and number of teeth (e.g., 20T and 17T, respectively). Accordingly, the sprockets $S_5$ and $S_6$ will not be explained and/or illustrated in detail herein for the sake of brevity. However, it will be apparent to those skilled in the art from this disclosure that the descriptions and illustrations of the sprockets $S_3$ and $S_4$ also apply to the sprockets $S_5$ and $S_6$, except as explained and illustrated herein.

Similarly, the carrier $C_3$ is identical to the carrier $C_2$, except that the carrier has a smaller outer periphery so as to accommodate the smaller sprockets $S_5$ and $S_6$ and the space maintaining projections 44*c* of the sprocket carrier $C_2$ have been eliminated on the carrier $C_3$. Due to the smaller diameter of the sprockets $S_5$ and $S_6$, deflection of these sprockets is less likely than with the larger sprockets $S_1$-$S_4$. In any case, the sprockets $S_5$ and $S_6$ are mounted to opposite axial sides of the third sprocket carrier $C_3$ using a plurality of fasteners 46, such as rivets, in the manner identical to the manner in which the sprockets $S_3$ and $S_4$ are attached to the second sprocket carrier $C_2$.

The sprockets $S_1$ and $S_2$ are mounted to the carrier $C_1$ before mounting the sprocket carrier $C_1$ on the freewheel 13. Similarly, the sprockets $S_3$ and $S_4$ are mounted to the carrier $C_2$ before mounting the sprocket carrier $C_2$ on the freewheel 13 adjacent the carrier $C_1$, and the sprockets $S_5$ and $S_6$ are mounted to the sprocket carrier $C_3$ before mounting the carrier $C_3$ on the freewheel 13 adjacent the carrier $C_2$. In other words, the carrier $C_1$ is preferably mounted on the freewheel 13 first, followed by the sprocket carrier $C_2$ and then the sprocket carrier $C_3$. After installing the sprocket carriers $C_1$-$C_3$ on the freewheel 13, the sprocket $S_7$, one of the spacers T, the sprocket $S_8$, the other spacer T and the sprocket $S_9$ can be installed onto the freewheel 13. At least the sprocket carriers the sprocket carriers $C_1$-$C_3$ and the sprockets $S_7$-$S_9$ have internally splined mounting holes so as to be non-rotatably mounted on the freewheel 13. The spacers T can be internally splined, but do not have to be.

As shown in FIG. 2, the rear hub 11 is fastened to the rear fork of the bicycle frame 14. The freewheel 13 is disposed at one end of the rear hub 11. The freewheel 13 is conventional, and thus, will not be explained and/or illustrated in detail herein. The freewheel 13 basically includes an outer race or (tubular) ring 50, an inner race or (tubular) ring 52 and a one-way clutch 54 disposed between the inner and outer races 50 and 52. The outer race 50 has external splines extending in a longitudinal direction parallel to the rotation axis X. The rear sprocket assembly 12 slides onto the splines of the outer race 50 such that the rear sprocket assembly 12 is non-rotatably mounted on the outer race 50. A ring stopper 56 is thrreadedly mounted on the laterally outward end of the outer race 50 to retain the rear sprocket assembly 12 on the outer race 50.

In understanding the scope of the present invention, as discussed above, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle rear sprocket assembly comprising:

a sprocket carrier including an annular mounting boss and a plurality of attachment members extending radially outward from the annular mounting boss, the plurality of attachment members being circumferentially spaced apart from one another relative to the annular mounting boss, with each of the attachment members having an inner end portion and an outer end portion disposed radially outwardly of the inner end portion relative to a rotation axis of the sprocket carrier, at least one of the attachment members having a pair of space maintaining projections extending in an axial direction therefrom;

a first sprocket including a first attachment portion with at least one attachment aperture and a first chain engaging portion with a plurality of first teeth, the first sprocket being disposed on a first axial side of the attachment member;

a second sprocket including a second attachment portion and a second chain engaging portion with a plurality of second teeth that are fewer in total number than a total number of the first teeth of the first sprocket, the second sprocket being disposed on a second axial side of the attachment member, the second attachment portion having at least one tab that extends radially inward along the at least one of the attachment members between the pair of space maintaining projections, and the second attachment portion having at least one attachment aperture located radially outwardly and spaced radially outwardly apart from the at least one tab; and a third sprocket including a third chain engaging portion with a plurality of third teeth that are fewer in total number than a total number of the second teeth of the second sprocket, the third sprocket being disposed on a second axial side of the second sprocket, the first and second attachment portions being attached to the outer end portion of the attachment member using a common fastener that extends through the attachment apertures of the first and second attachment portions and the outer end portion of the attachment member, the tab having a free edge spaced radially inwardly from the common fastener by a distance at least as large as one-half of a maximum transverse dimension of the fastener measured in a direction perpendicular to the rotation axis, the pair of space maintaining projections extending from the at least one of the attachment members axially past the tab of the second sprocket towards the third sprocket, the space maintaining projections being spaced radially outward from the inner end portion of the least one attachment member and radially inward of a center axis of the common fastener with the space maintaining projections disposed closer to the center axis of the common fastener than the annular mounting boss.

2. The bicycle rear sprocket assembly according to claim 1, wherein the free edge is spaced radially inwardly from the common fastener by a distance at least as large as the maximum transverse dimension of the fastener measured in a direction perpendicular to the rotation axis.

3. The bicycle rear sprocket assembly according to claim 2, wherein the free edge is spaced radially inwardly from the common fastener by a distance larger than a radial space between the common fastener and a plurality of second roots of the second sprocket.

4. The bicycle rear sprocket assembly according to claim 1, wherein the outer end portion of the attachment member has a first axially facing surface disposed on the first axial side with the first attachment portion opposed thereto and a second axially facing surface disposed on the second axial side with the second attachment portion opposed thereto, and the free edge of the second attachment portion at least partially overlaps the second axially facing surface as viewed in a direction parallel to the rotation axis.

5. The bicycle rear sprocket assembly according to claim 4, wherein the second attachment portion contacts the second axially facing surface of the outer end portion of the attachment member.

6. The bicycle rear sprocket assembly according to claim 4, wherein the free edge is disposed at a radially inward most free end of the tab.

7. The bicycle rear sprocket assembly according to claim 6, wherein at least a majority of the radially inwardly extending tab overlaps the second axially facing surface as viewed in a direction parallel to the rotation axis.

8. The bicycle rear sprocket assembly according to claim 6, wherein the pair of space maintaining projections extend from the second axially facing surface with the tab disposed therebetween.

9. The bicycle rear sprocket assembly according to claim 1, wherein the tab has a corresponding circumferential width, and the pair of space maintaining projections are circumferentially spaced apart from one another by a distance equal to the circumferential width of each of the tab.

10. The bicycle rear sprocket assembly according to claim 1, wherein the at least one of the attachment members includes a cutout that extends from proximate the inner end portion toward the outer end portion thereof.

11. The bicycle rear sprocket assembly according to claim 10, wherein the cutout extends radially outward between the pair of space maintaining projections.

12. The bicycle rear sprocket assembly according to claim 1, wherein the pair of space maintaining projections are dimensioned in an axial direction to contact the third sprocket.

13. The bicycle rear sprocket assembly according to claim 1, the annular mounting boss, the plurality of attachment members and the pair of space maintaining projections are integrally formed as a one-piece, unitary member.

14. The bicycle rear sprocket assembly according to claim 1, the pair of space maintaining projections are dimensioned to contact the third sprocket with the first, second and third sprockets with the bicycle rear sprocket assembly completely assembled in a flex-free condition.

15. The bicycle rear sprocket assembly according to claim 1, each of the plurality of attachment members includes a pair of space maintaining projections, and the second sprocket includes a plurality of the tabs, each of the plurality of tabs corresponding to one of the plurality of attachment members.

16. The bicycle rear sprocket assembly according to claim 15, the plurality of tabs are circumferentially spaced apart from one another relative to the second chain engaging portion, each of the plurality of tabs extending radially inward along a corresponding one of the plurality of attachment members between the corresponding pair of space maintaining projections.

17. The bicycle rear sprocket assembly according to claim 15, wherein each of the plurality of attachment members includes a cutout that extends from proximate the inner end portion toward the outer end portion thereof.

18. The bicycle rear sprocket assembly according to claim 17, wherein the cutouts extends radially outward between the pair of space maintaining projections on a corresponding one of the attachment members.

19. The bicycle rear sprocket assembly according to claim 15, the second attachment portion includes a plurality of attachment apertures, each attachment aperture being located radially outwardly and spaced apart from a corresponding adjacent one of the plurality of tabs.

* * * * *